United States Patent

[11] 3,552,379

| [72] | Inventor | Robert E. Clarke |
| | | 1410 Saratoga Drive, Bel Air, Md. 21014 |
| [21] | Appl. No. | 778,227 |
| [22] | Filed | Nov. 22, 1968 |
| [45] | Patented | Jan. 5, 1971 |

[54] FOOD PACKAGE AND HEATER THEREFOR
4 Claims, 7 Drawing Figs.

[52] U.S. Cl. ..................................................... 126/262, 126/43
[51] Int. Cl. ....................................................... A47g 23/04
[50] Field of Search........................................... 126/261, 262, 263, 265, 266, 38, 43

[56] References Cited
UNITED STATES PATENTS

| 1,260,798 | 3/1918 | Popper............................ | 126/38 |
| 3,059,633 | 10/1962 | Laerum........................... | 126/262 |
| 3,101,707 | 8/1963 | Ryan et al....................... | 126/263 |

FOREIGN PATENTS

| 183,068 | 4/1907 | Germany........................ | 126/38 |
| 392,459 | 5/1933 | Great Britain................. | 126/43 |

*Primary Examiner*—Charles J. Myhre
*Attorney*—J. Wesley Everett and George L. Brehm ABSTRACT: A food package having a tray-type receptacle for food and a heater therefor comprised of a tray of dimensions similar to the food tray and adapted to support the same thereupon, a combustible material in the second tray, the second tray having air intake openings in the sidewalls thereof near the bottom and pressed out portions in its sidewalls extending to the top edge thereof forming vents for the products of combustion and to direct the heat uniformly throughout the lower surface of the food receptacle and around the sidewalls thereof.

PATENTED JAN 5 1971 3,552,379

INVENTOR
ROBERT E. CLARKE

PATENTED JAN 5 1971

INVENTOR
ROBERT E. CLARKE

BY: *Stanley Gusett*
ATTORNEY

*George L. Brehm*
AGENT

FOOD PACKAGE AND HEATER THEREFOR

This invention relates to food trays and heaters therefor and more especially to such trays and heaters which are portable and after use may be completely disposed of and which may be used by sportsmen, campers, the military, as well as in the home.

Food packages containing heating means have been used in the past but many have been made as a single unit device which frequently are found disadvantageous, as the user is limited to the specific food contained in the package. In my device, however, the heater tray is made as a separate article which may or may not be sold with the food tray, in fact I contemplate having the heater tray made in sizes to receive the standard trays containing complete meals, known in the trade as TV dinners. A user may then provide himself with a number of heater trays and use them with any of the numerous TV dinners now available and after use dispose of the heater tray as he disposes of the food tray.

It is one object of my invention therefore to provide a heater tray for use with standard trays containing frozen or refrigerated food.

It is another object to provide such a heater means which is light and readily portable and is disposable after use.

It is still another object to provide such a heater tray which due to its structural details will heat uniformly and efficiently.

It is still further an object to provide such a tray which will be economical to manufacture and may be sold at a relatively low cost.

These and other objects and advantages will be more apparent from the following detailed description, in which reference is had to the accompanying drawings forming a part of this specification and in which.

Figure 1:
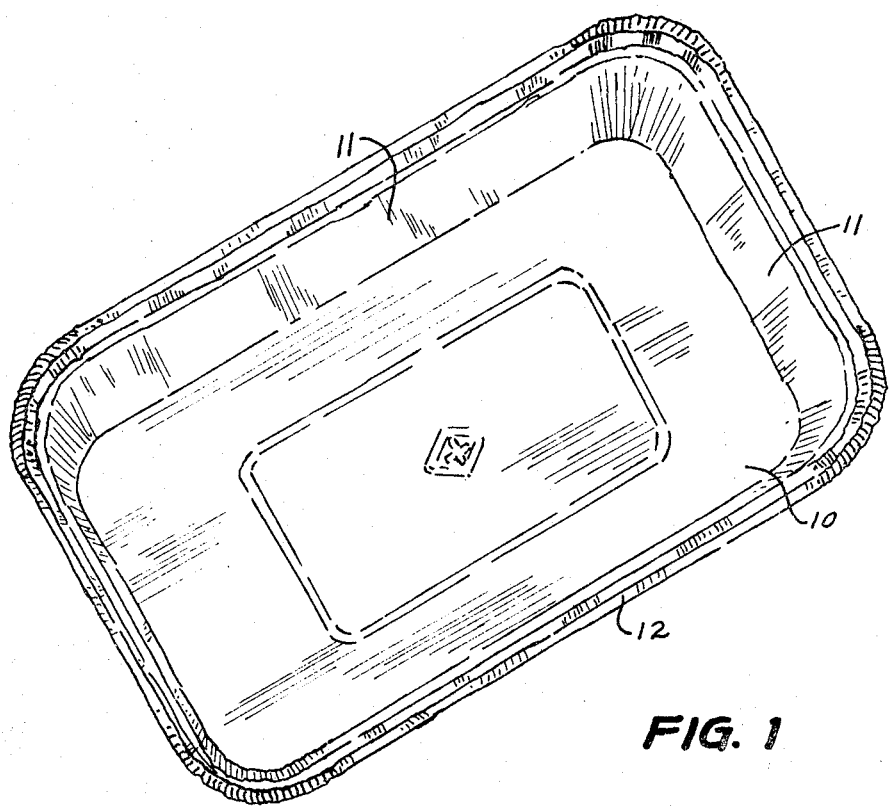
FIG. 1 is a top perspective view of a food tray for use with my new heater tray.
Figure 2:
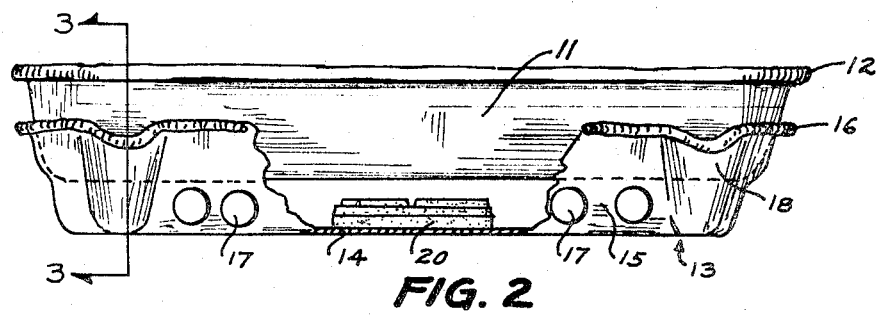
FIG. 2 is a side elevational view partly broken away of my heater tray with a food tray thereon ready for use.
Figure 3:
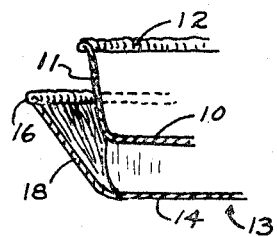
FIG. 3 is a fragmentary section on line 3–3 of FIG. 2.
Figure 4:
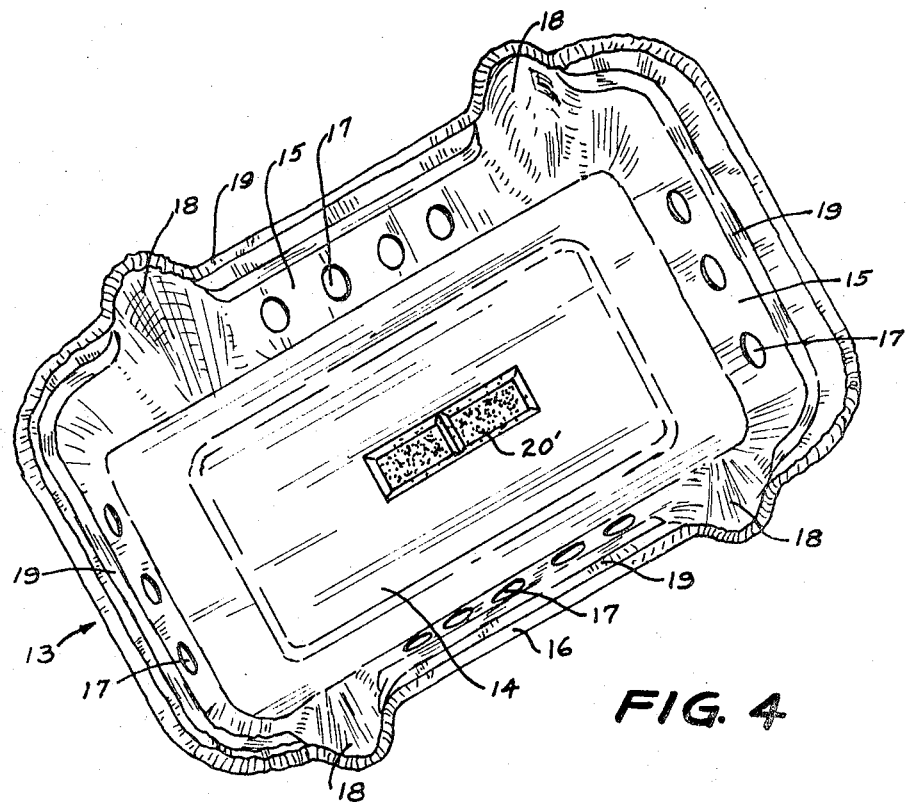
FIG. 4 is a top perspective view of the heater tray.

Referring to the drawing in more detail, the food tray is of conventional rectangular shape with a substantially flat bottom portion 10, upwardly inclined sidewalls 11 and a flanged upper rim portion 12. This tray may be made of metal foil such as aluminum foil and may conveniently be made of a single flat sheet die pressed into the shape shown.

The heater tray portion generally indicated by reference numeral 13 is similarly formed from metal foil and has a flat bottom 14, inclined sidewalls 15 and a flanged rim portion 16.

The inclined sidewalls are perforated at 17 on all sides of the tray, such perforations located near the bottom of the tray.

At spaced intervals in the inclined sidewalls portions thereof are pressed outwardly to form channel-shaped portions 18 the function of which will be later described.

In addition, the inclined sidewalls are formed about midway of their height and above the perforations 17 therein with ledges or shoulder portions 19 which form surfaces upon which the food tray may rest when placed on the heater tray.

It may be now seen that the pressed out channel shaped portions 18 form, with the inclined sidewalls of the food tray, vents or "chimneys" at spaced positions about the device to allow escape of the products of combustion and promote a more even distribution of the heat in the heater tray across the bottom and up the inclined sides of the food tray.

To produce heat, the heater tray is provided with a combustible substance 20 preferably attached to the bottom thereof. This combustible substance may be any of the well-known solid combustibles and the amount employed is determined by the amount of heat required to adequately heat the food contained in the food tray.

Figure 5:
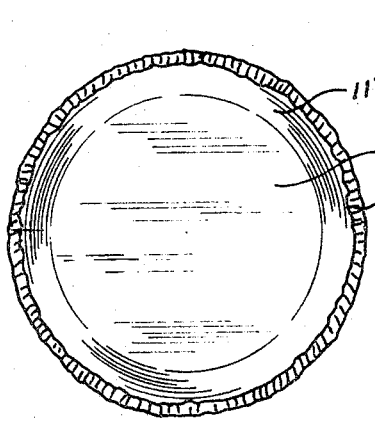
FIG. 5 is a top plan view of a food tray of the round type for use with the heater tray shown in FIG. 6.
Figure 6:
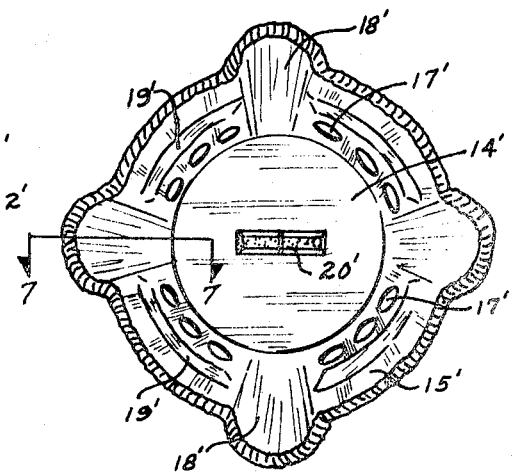
FIG. 6 is a top plan view of a heater tray adapted to receive a round food tray.
Figure 7:
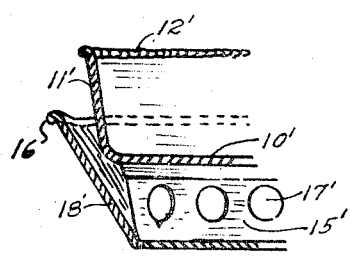
FIG. 7 is a fragmentary section on line 7–7 of FIG. 6 with a food tray seated thereon.

FIGS. 5, 6 and 7 illustrate a modified form, in which the food and heater trays are round instead of rectangular, but in all other respects possess the same features as the first form described.

The food tray has a flat bottom 10′ and inclined sidewalls 11′ with an upper flanged rim 12′.

The heater tray has the flat bottom 14′, inclined sidewalls 15′ and upper flanged rim 16′. The inclined sidewalls are perforated near the bottom with holes 17′ and are provided with ledges 19′ about midway of the height thereof to form support means for the food tray.

The sidewalls in addition are formed with pressed out channel portions 18′ similar in form and function to channels 18 in the first form described.

The solid combustible fuel 20′ is located on the bottom 14′ of the heater tray.

Both forms of the device function in the same manner. The user simply ignites the fuel and positions the food tray on the ledges 19 or 19′ of the heater tray. Air for combustion of the fuel enters the space between the bottoms of the two trays through the perforations 17 or 17′ and the products of combustion are carried out through the channels 18 or 18′. Heat is therefore uniformly applied to the bottom of the food tray and the contents thereof uniformly heated. After use, both the food tray and heater tray are readily disposable, in fact may be reduced to a small volume by crushing as the foil material from which they are made may be crumpled easily by hand.

I claim:

1. As a new article of manufacture a heater tray comprising:
   a. a bottom wall and upwardly and outwardly inclined sidewalls rising therefrom;
   b. the sidewalls having a number of spaced pressed out portions forming inwardly facing channels extending from the bottom to the top of the sidewalls;
   c. portions of the sidewalls between the channels and intermediate the height of said sidewalls extending outwardly and forming horizontal ledges interiorly of the sidewalls;
   d. openings in the sidewalls between the bottom of the tray and the said ledges; and
   e. a solid fuel attached to the bottom of the tray.

2. The structure defined in claim 1 in combination with a food tray having:
   a. a bottom wall and upwardly and outwardly inclined sidewalls rising therefrom;
   b. the bottom wall being of a size to rest upon said horizontal ledges of said heater tray;
   c. said inwardly facing channels in said heater tray forming vents extending from below said bottom of said food tray along the sidewalls thereof.

3. The structure defined in claim 1 in which the heater tray is formed of metal foil.

4. The combination defined in claim 2 in which both trays are formed of metal foil.